US010212108B2

(12) United States Patent
Yoo et al.

(10) Patent No.: US 10,212,108 B2
(45) Date of Patent: Feb. 19, 2019

(54) METHOD AND SYSTEM FOR EXPANDING FUNCTION OF MESSAGE IN COMMUNICATION SESSION

(71) Applicant: LINE Corporation, Shibuya-ku, Tokyo (JP)

(72) Inventors: Geum Yong Yoo, Seongnam-si (KR); Eun Hyuk Kim, Seongnam-si (KR); Yongseon Yim, Seongnam-si (KR); Yonggi Hwang, Seongnam-si (KR); Dongyoung Kim, Seongnam-si (KR); Chul-soon Choi, Seongnam-si (KR)

(73) Assignee: LINE CORPORATION, Tokyo (JP)

(*) Notice: Subject to any disclaimer, the term of this patent is extended or adjusted under 35 U.S.C. 154(b) by 268 days.

(21) Appl. No.: 15/287,058

(22) Filed: Oct. 6, 2016

(65) Prior Publication Data

US 2017/0104703 A1    Apr. 13, 2017

(30) Foreign Application Priority Data

Oct. 7, 2015    (KR) .................. 10-2015-0141091

(51) Int. Cl.
*G06F 15/16* (2006.01)
*H04L 12/58* (2006.01)
(Continued)

(52) U.S. Cl.
CPC ............ *H04L 51/046* (2013.01); *H04L 51/10* (2013.01); *H04L 65/1066* (2013.01);
(Continued)

(58) Field of Classification Search
CPC ... H04L 51/046; H04L 51/10; H04L 65/1066; H04L 65/1083; H04L 67/02; G06F 3/0482; G06F 3/04842
See application file for complete search history.

(56) References Cited

U.S. PATENT DOCUMENTS 9,213,952 B2 * 12/2015 Heyman ................ G06Q 10/06
2004/0236716 A1 * 11/2004 Carro .................... G06F 17/218
(Continued)

FOREIGN PATENT DOCUMENTS

KR    2008-0078431 A    8/2008
KR    2015-0062541 A    6/2015
WO    WO-2015/065001 A1    5/2015

OTHER PUBLICATIONS

Korean Office Action for Application No. 10-2015-0141091 dated Jul. 25, 2016.
(Continued)

*Primary Examiner* — Moustafa M Meky
(74) *Attorney, Agent, or Firm* — Harness, Dickey & Pierce, P.L.C.

(57) ABSTRACT

A system includes a memory configured to store computer-readable instructions; and one or more processors configured to execute the computer-readable instructions such that the one or more processors are configured to, receive a message from a first electronic device connected to a communication session for an instant messaging service, determine hidden attribute information for playing content corresponding to a keyword using the keyword further included in the message, if the message includes a desired character, add the determined hidden attribute information to the message, and transmit the message to which the hidden attribute information is added, to a second electronic device connected to the communication session through the communication session.

25 Claims, 14 Drawing Sheets

(51) Int. Cl.
*H04L 29/06* (2006.01)
*G06F 3/0482* (2013.01)
*G06F 3/0484* (2013.01)
*H04L 29/08* (2006.01)

(52) U.S. Cl.
CPC ........ *H04L 65/1083* (2013.01); *G06F 3/0482* (2013.01); *G06F 3/04842* (2013.01); *H04L 67/02* (2013.01)

(56) References Cited

U.S. PATENT DOCUMENTS

| | | |
|---|---|---|
| 2007/0106892 A1 | 5/2007 | Engberg |
| 2012/0203846 A1 | 8/2012 | Hull et al. |
| 2012/0296993 A1* | 11/2012 | Heyman ................ G06Q 10/06 709/206 |
| 2013/0260893 A1 | 10/2013 | Shin et al. |
| 2013/0332543 A1 | 12/2013 | Shin et al. |
| 2014/0019540 A1 | 1/2014 | Shin et al. |
| 2016/0036734 A1* | 2/2016 | Ruth ....................... A63F 13/35 709/206 |

OTHER PUBLICATIONS

Office Action for Corresponding Taiwanese Patent Application No. 105132503 dated Nov. 1, 2017.

* cited by examiner

METHOD AND SYSTEM FOR EXPANDING FUNCTION OF MESSAGE IN COMMUNICATION SESSION

CROSS-REFERENCE TO RELATED APPLICATION(S)

This application claims priority under 35 U.S.C. § 119 to Korean Patent Application No. 10-2015-0141091 filed Oct. 7, 2015, in the Korean Intellectual Property Office (KIPO), the entire contents of which are incorporated herein by reference.

BACKGROUND

Field

One or more example embodiments relate, generally, to facilitating communications sessions. More specifically, one or more example embodiments relate to a method and system for expanding a function of a message in a communication session.

Description of Related Art

Some techniques provide additional functions, such as a search, a game, etc., through an instance messaging service. For example, provided is a technique for conducting an Internet search from an instant messaging application. Such related art discloses a configuration of recognizing an instant message input from a user as a search query, processing a web search in response to the search query, and providing a search result to the user.

However, in the related art, an additional function is simply used to transfer a keyword or an instruction to a server by using a chat input box as a keyword input box or an instruction input box for controlling the additional function. For example, the server simply provides a search result corresponding to the received keyword or processes the received instruction and provides a processing result.

SUMMARY

One or more example embodiments provide a message expansion method and system that may transfer, to a reception side, a message to which hidden attribute information is added in response to a keyword of a message transmitted through an instant messaging service, such that the reception side may play a variety of contents in various manners based on the hidden attribute information.

According to at least some example embodiments, a system includes a memory configured to store computer-readable instructions; and one or more processors configured to execute the computer-readable instructions such that the one or more processors are configured to, receive a message from a first electronic device connected to a communication session for an instant messaging service, determine hidden attribute information for playing content corresponding to a keyword using the keyword further included in the message, if the message includes a desired character, add the determined hidden attribute information to the message, and transmit the message to which the hidden attribute information is added, to a second electronic device connected to the communication session through the communication session.

According to at least some example embodiments, a method of expanding a message includes receiving a message from a first electronic device connected to a communication session for an instant messaging service, the message including a keyword; determining hidden attribute information for playing content corresponding to the keyword, if the message includes a desired character; adding the determined hidden attribute information to the message; and transmitting the message to which the hidden attribute information is added, to a second electronic device connected to the communication session through the communication session. According to at least some example embodiments, a method of expanding a message includes receiving a message at a first electronic device connected to a communication session for an instant messaging service, the message being received from a server that provides the instant messaging service through the communication session; and playing content at the first electronic device if the message includes the hidden attribute information, the content corresponding to hidden attribute information, wherein the server, receives the message from a second electronic device through the communication session, determines the hidden attribute information for playing content corresponding to a keyword further included in the message if the message includes a desired character, adds the hidden attribute information to the message, and transmits, to the first electronic device, the message to which the hidden attribute information is added.

According to at least some example embodiments, since a message to which hidden attribute information is added is transferred to a reception side in response to a keyword of a message transmitted through an instant messaging service, the reception side may play a variety of contents in various manners based on the hidden attribute information.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

Figure 1:
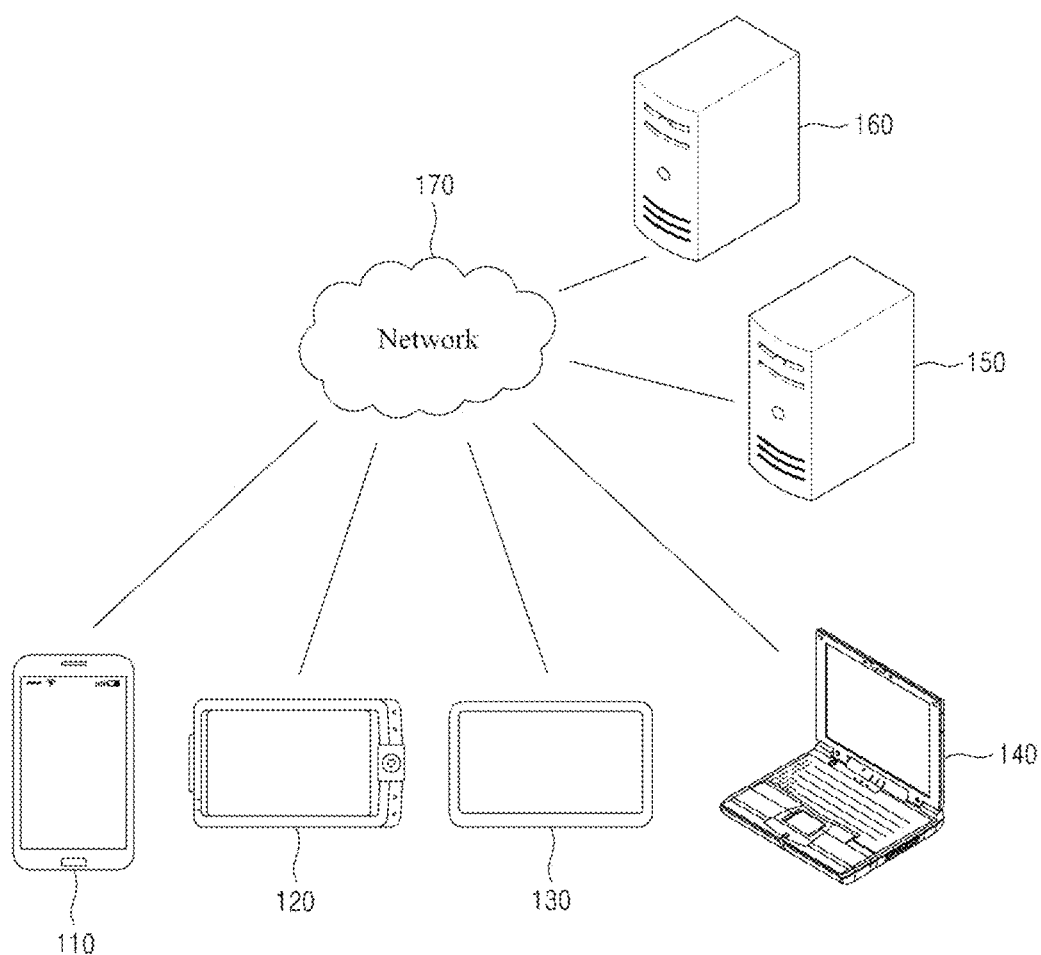
FIG. 1 illustrates an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to execute the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent (e.g., non-volatile) mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be described as being embodied by one computer processing device; however, one skilled in the art will appreciate that a hardware device may include multiple processing elements and multiple types of processing elements. For example, a hardware device may include multiple processors (e.g., a multiprocessor system) or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Example embodiments relate to technology for recommending a meeting place based on appointment information. In detail, the example embodiments relate to a method, system, and non-transitory computer-readable medium that may provide appointment information of a meeting associated with users to affiliated stores, may receive recommendation information about a meeting place from the affiliated stores, and may provide the received recommendation information to the users.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as only an example and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, navigation, a computer, a laptop computer, a digital broadcasting terminal, a personal digital assistant (PDA), a portable multimedia player (PMP), a tablet PC, and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, file, contents, services, and the like through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. The electronic device 110 may use a service and/or content provided from the server 150 by connecting to the server 150 under control of at least one program, for example, browser or the installed application and an operating system (OS) included in the electronic device 110.

For example, in response to a service request message transmitted from the electronic device 110 to the server 150 over the network 170 under control of the application, the server 150 may transmit a code corresponding to the service request message to the electronic device 110. The electronic device 110 may provide content to a user by displaying a code-based screen (e.g., a screen generated in accordance with instructions included in the received code) under control of the application. As another example, the server 150 may set a communication session for a messaging service and may route transmission and/or reception of a message between the plurality of electronic devices 110, 120, 130, and 140 through the set communication session.

Figure 2:
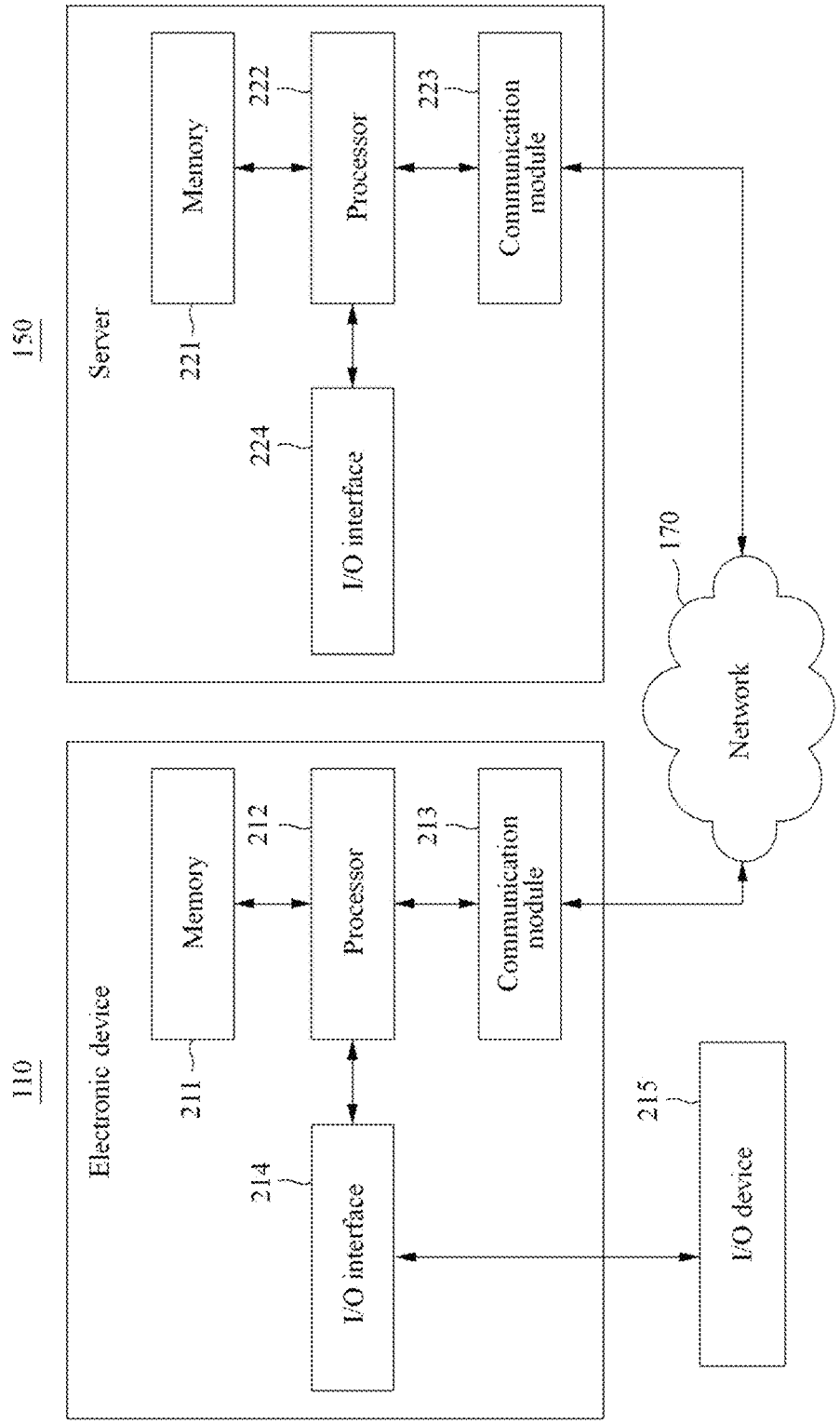
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The electronic devices 120, 130, and 140, and/or the server 160 may have the same or similar configuration to the electronic device 110 and/or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211 and/or memory 221 may include random access memory (RAM) and/or a permanent mass storage device, such as read only memory (ROM), a magnetic or optical disk drive, a non-volatile solid state drive, etc., as a computer-readable storage medium. Also, an OS and at least one program code, for example, the aforementioned code for browser or the application installed and executed on the electronic device 110, may be stored in the memory 211 and/or memory 221. Such software constituent elements may be loaded from another computer-readable storage medium separate from the memory 211 and/or memory 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211 and/or memory 221 through the communication module 213 and/or communication module 223, instead of, or in addition to, the computer-readable storage medium. For example, at least one program may be loaded to the memory 211 and/or memory 221 based on a program, for example, the application, installed by files provided over the network 170 from developers or a file distribution system, for example, the server 160, that provides an installation file of the application.

The processor 212 and/or processor 222 may be configured to process computer-readable instructions, for example, the aforementioned at least one program code, of a computer program by performing basic arithmetic operations, logic operations, and I/O operations. The computer-readable instructions may be provided from the memory 211, memory 221, communication module 213, and/or communication module 223 to the processor 212 and/or processor 222. For example, the processor 212 and/or processor 222 may be configured to execute received instructions in response to the program code stored in the storage device such as the memory 211, 222.

The communication module 213 and/or communication module 223 may be embodied, for example, by circuits or circuitry or, alternatively, a processor executing program code including instructions corresponding to any or all operations described herein as being performed by the communication module 213 and/or communication module 223. The communication module 213 and/or communication module 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a streaming service request for content, generated based on a program code stored in the storage device such as the memory 211, to the server 150 over the network 170 under control of the communication module 213. Inversely, a control signal, an instruction, content, file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 and/or I/O interface 224 may be a device (e.g., a circuit and/or a processor executing firmware) that interfaces with an I/O device 215. According to at least some example embodiments, the I/O device 215 is, or includes, an input device and/or an output device. Examples of such input devices include, but are not limited to, a keyboard, a mouse, etc., and examples of such output devices include, but are not limited to, a device, such as a display (e.g., a touch screen, liquid crystal display (LCD), for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O device 215, or may further include other constituent elements, for example, a transceiver, a global positioning system (GPS) module, a camera, a variety of sensors, a database, and the like.

Figure 3:
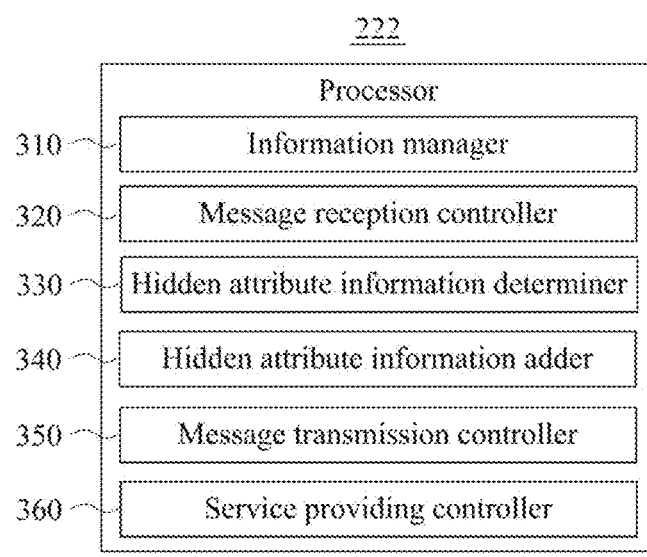
FIG. 3 is a block diagram illustrating an example of a processor of a server according to at least one example embodiment.
Figure 4:
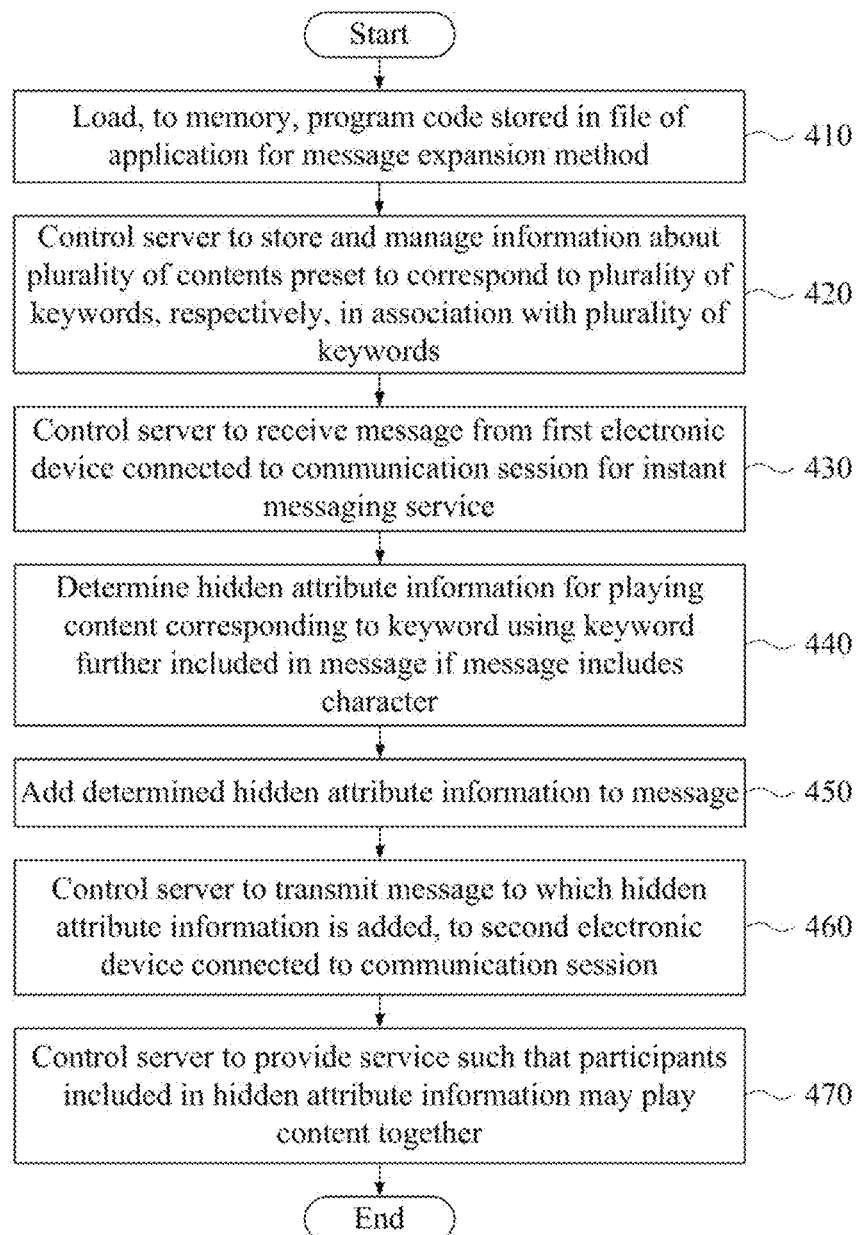
FIG. 4 is a flowchart illustrating an example of a message expansion method performed at a server according to at least one example embodiment.

FIG. 3 is a block diagram illustrating an example of a processor of a server according to at least one example embodiment, and FIG. 4 is a flowchart illustrating an example of a message expansion method performed at a server according to at least one example embodiment.

Referring to FIG. 3, the processor 222 of the server 150 may include an information manager 310, a message reception controller 320, a hidden attribute information determiner 330, a hidden attribute information adder 340, a message transmission controller 350, and a service providing controller 360. The processor 222 and the constituent elements of the processor 222 may control the server 150 to perform operations 410 through 470 included in the message expansion method of FIG. 4. For example, the processor 222 and the constituent elements of the processor 222 may be configured to execute computer-readable instructions according to at least one program code and a code of an operating system (OS) included in the memory 221 of the server 150.

In operation 410, the processor 222 may load, to the memory 221, a program code stored in a program file for the message expansion method. For example, a program may be installed on the server 150 based on the program file. Here, in response to executing the program installed on the server 150, the processor 222 may load the program code to the memory 221. Here, the information manager 310, the message reception controller 320, the hidden attribute information determiner 330, the hidden attribute information adder 340, the message transmission controller 350, and the service providing controller 360 included in the processor 222 may be configured to perform operations 420 through 470, respectively, by executing computer-readable instructions corresponding to the program code loaded to the memory 221. For example, according to at least one example embodiment, operations described herein as being performed by any or all of the information manager 310, the message reception controller 320, the hidden attribute information determiner 330, the hidden attribute information adder 340, the message transmission controller 350, and the service providing controller 360 may be performed by a processor (e.g., the processor 222) executing program code that includes instructions corresponding to the operations. The instructions may be stored, for example, in a memory of the server 150. The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA).

According to at least some example embodiments, the constituent elements of the processor 222 (e.g., the information manager 310, the message reception controller 320, the hidden attribute information determiner 330, the hidden attribute information adder 340, the message transmission controller 350, and the service providing controller 360) may be elements of the server 150 that are controlled by the processor 222. For example, the processor 222 may control the communication module 223 included in the server 150 such that the server 150 may communicate with an electronic device, for example, the electronic device 110 or another server, for example, the server 160.

In operation 420, the information manager 310 may control the server 150 to store and manage information about a plurality of contents preset to correspond to a plurality of keywords, respectively, in association with the plurality of keywords. For example, a keyword and information about content may be matched to each other and thereby stored and managed in a database includable in the server 150. For example, the server 150 (e.g., the processor 222) may store information (e.g., a table) that identifies a plurality of keywords and identifies, for each one of the identified keywords, information identifying one or more types of content corresponding to the identified keyword. Additionally, or alternatively, the server 150 (e.g., the processor 222) may store information (e.g., a table) that identifies one or more types of content and identifies, for each of the one or more identified types of content, information identifying keywords corresponding to the identified type of content.

In more detail, Table 1 shows an example of a table stored in a database.

TABLE 1

| Keyword | Content | | |
|---------|---------|---|---|
| | Type | Identifier | Source |
| @ladder-game | Game | Ladder | http://aaa . . . |
| @dice-game | Game | Dice | http://bbb . . . |
| @AAA-ad | Advertisement | AAA | http://ccc . . . |
| @BBB-ad | Advertisement | BBB | http://ddd . . . |

Referring to Table 1, a type of content, such as a game, an advertisement, etc., may be preset for the content, and an identifier of content may be set as a name of the content. A source of content may be provided in a form of a uniform resource locator (URL) as a network address for providing the content. The URL may be used to provide the content to the user through a link, for example, a link "ladder game" 610 of FIG. 6, for playing the content. As another example, a source of content may include information used to execute an application for playing the corresponding content. For example, content of a ladder game may include a source that includes a function for executing an application for the ladder game, and, if the application is not installed, a function for installing the application. Information about content may further include information, such as a display type (for example, a video, a banner, an audio, etc.) or an additional source (for example, "media source" information included in hidden attribute information 740 of FIG. 7), based on an attribute of the content.

The information manager 310 may be selectively included in the processor 222 based on example embodiments (e.g., the functions of the information manager 310 may be performed by the processor 222 in some example embodiments, and not performed by the processor 222 in other example embodiments). If the information manager 310 is not included in the processor 222, operation 420 may be omitted. In this case, the content corresponding to the keyword may be set through a real-time keyword search. For example, operation 420 may be omitted and, in operation 440, the hidden attribute information determiner 330 may retrieve the content corresponding to the keyword on the Internet and may generate hidden attribute information for playing the retrieved content.

In operation 430, the message reception controller 320 may control the server 150 to receive a message from a first electronic device connected to a communication session for an instant messaging service. The server 150 may provide the instant messaging service such that messages transmitted and received between electronic devices connected to the communication session may be transferred to a desired electronic device through routing. Here, operation 430 may be a process of receiving a message from the first electronic device corresponding to one of the electronic devices. For example, the first electronic device may provide a user interface, for example, a chat input box, for receiving a text from a user under control of an application executed on the first electronic device. In response to a text input from a user of the first electronic device through the provided user interface, the first electronic device may transmit a message including the input text to the server 150 through the communication session.

In operation 440, if the message includes a preset (or, alternatively, desired) character, the hidden attribute information determiner 330 may determine hidden attribute information for playing content corresponding to a keyword using the keyword further included in the message. For example, the hidden attribute information determiner 330 may retrieve the content corresponding to the keyword from among a plurality of contents preset to correspond to a plurality of preset keywords, and may generate hidden attribute information about the retrieved content. If operation 420 is omitted, the hidden attribute information determiner 330 may also generate hidden attribute information about content found using the keyword (e.g., the functions of the hidden attribute information determiner 330 may be performed by the processor 222).

The preset (or, alternatively, desired) character may include various characters or combination thereof, and a relationship between the keyword and the character may be variously configured. In the following, for clarity of description, it is assumed that the preset (or, alternatively, desired) character is "@" and a character string after "@" in a message starting with the character "@" is a keyword. For example, in a message "@ladder-game", "ladder-game" may correspond to the keyword. Here, the hidden attribute information determiner 330 may verify "ladder-game" as the keyword since the character "@" is included in the message. Also, the hidden attribute information determiner 330 may determine hidden attribute information of content corresponding to the verified keyword "ladder-game". The hidden attribute information is further described below.

The hidden attribute information determiner 330 may retrieve corresponding content using the keyword included in the message from among the plurality of contents managed in operation 420. If operation 420 is omitted, the hidden attribute information determiner 330 may retrieve the content corresponding to the keyword on the Internet and may generate hidden attribute information. For example, the hidden attribute information determiner 330 may retrieve a game having a content name "ladder" with respect to a message "@ladder-game" and may generate hidden attribute information to include a source for progress of the game "ladder."

In operation 450, the hidden attribute information adder 340 may add the determined hidden attribute information to the message. For example, the hidden attribute information adder 340 may add the hidden attribute information to the message that includes the text "@adder-game.". In operation 460, the message transmission controller 350 may control the server 150 to transmit the message to which the hidden attribute information is added, to a second electronic device connected to the communication session through the communication session. The second electronic device may be a destination of the message. For example, a general message transmitted from a single electronic device in the communication session may be transmitted to all of the electronic devices connected to the communication session.

In operation 470, the service providing controller 360 may control the server 150 to provide a service such that participants identified by the hidden attribute information may play the content together. Depending on example embodiments, the service providing controller 360 may be selectively included in the processor 222 (e.g., the functions of the service providing controller 360 may be performed by the processor 222). If the service providing controller 360 is not included in the processor 222, operation 470 may be omitted. In this case, the content may be played at each of the electronic devices connected to the communication session. Also, the service for the plurality of participants to play the content may be enabled through a separate server, for example, a game server, associated with the content.

Hereinafter, the hidden attribute information will be further described.

Figure 5:
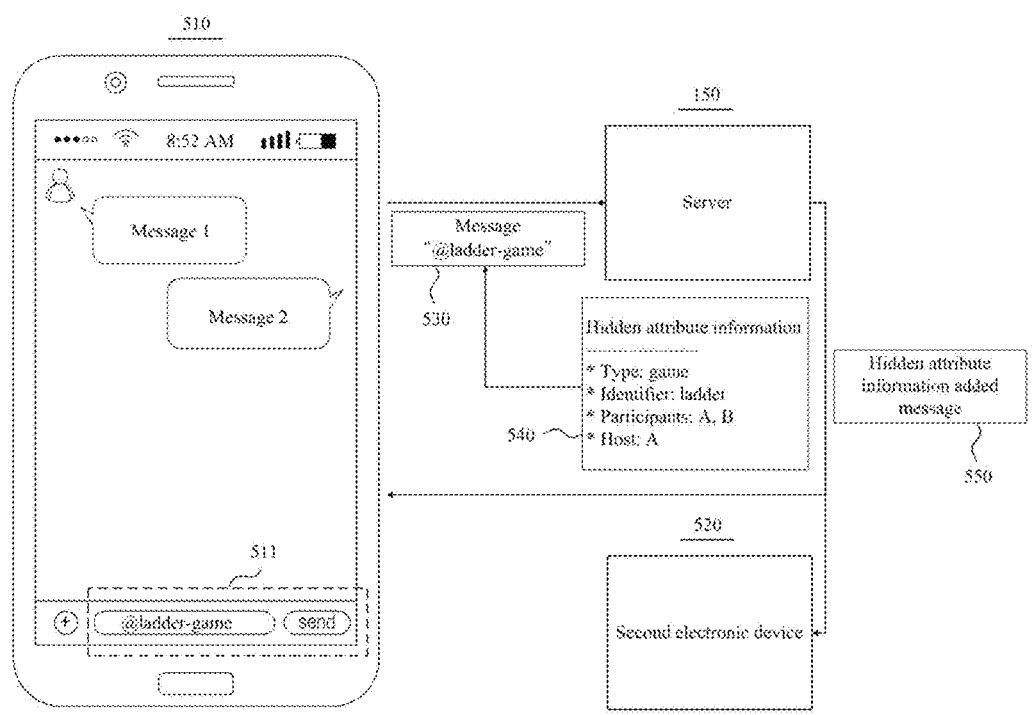
FIG. 5 illustrates an example of a process of providing a message to which hidden attribute information is added according to at least one example embodiment.

FIG. 5 illustrates an example of a process of providing a message to which hidden attribute information is added according to at least one example embodiment. FIG. 5 illustrates an example in which a first electronic device 510 and a second electronic device 520 communicate with each other through connection to a communication session set in association with an instant messaging service provided from the server 150.

Here, if a text "@ladder-game" is input to the first electronic device 510 and a "send" button is pushed by a user as shown in a box 511 indicated with dotted lines, a message "@ladder-game" 530 may be transmitted from the first electronic device 510 to the server 150.

In this case, the server 150 may verify that the preset (or, alternatively, desired) character "@" is included in the message "@ladder-game" 530 and may verify a keyword "ladder-game." Also, the server 150 may verify content "ladder game" corresponding to the keyword "ladder-game" and may determine or generate hidden attribute information 540 about the content "ladder game."

In this example, the server 150 may add the determined hidden attribute information 540 to the message "@adder-game" 530 and may generate a message 550 to which the hidden attribute information is added (hereinafter, also referred to as a hidden attribute information added message). The server 150 may transfer, to the second electronic device 520, the generated hidden attribute information added message 550. The hidden attribute information added message 550 may also be transferred to the first electronic device 510 (e.g., by the server 150).

The hidden attribute information 540 includes information indicating that a type of the content is "game," an identifier of the content is "ladder," participants include a participant A indicating a user of the first electronic device 510 and a participant B indicating a user of the second electronic device 520, and a host is the participant A.

Figure 6:
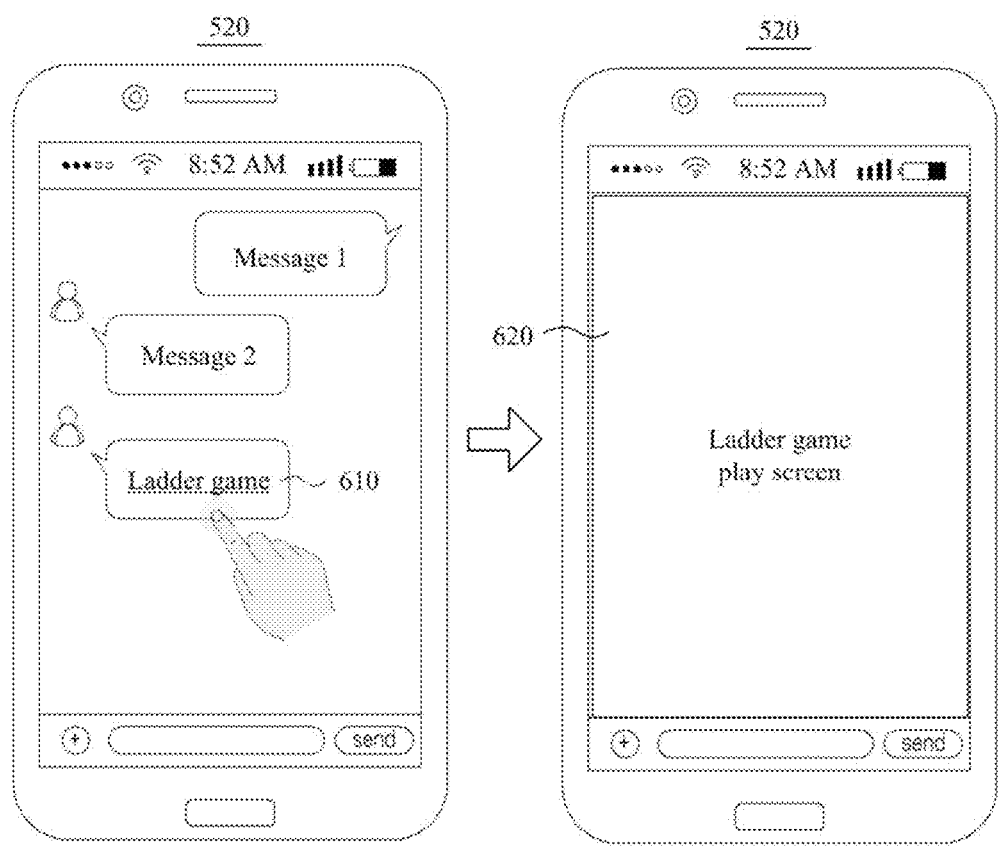
FIG. 6 illustrates an example of a process of providing content and a message to which hidden attribute information is added according to at least one example embodiment.

FIG. 6 illustrates an example of a process of providing content and a message to which hidden attribute information is added according to at least one example embodiment. FIG. 6 illustrates an example in which the second electronic device 520 generates a link "ladder game" 610 for playing content and displays the link "ladder game" 610 on a chatroom in response to receiving the hidden attribute information added message 550 in FIG. 5. Also, FIG. 6 illustrates an example of switching a chatroom screen to a ladder game play screen 620 and providing the ladder game play screen 620 in response to a user of the second electronic device 520 selecting, for example, tapping a touch screen, the link "ladder game" 610.

If necessary, the second electronic device 520 may execute a specific application to play corresponding content in response to the selection on the link "ladder game" 610. In this case, the ladder game play screen 620 may be provided through a ladder game application executed on the second electronic device 520 in response to the selection on the link "ladder game" 610.

Also, as described above with FIG. 5, the participants of the content include the participant A indicating the user of the first electronic device 510 and the participant B indicating the user of the second electronic device 520. The server 150 may provide a ladder game multi-play service to each of the participants A and B such that the two users may participate in the ladder game and play the game. For example, the hidden attribute information added message 550 may also be transferred to the first electronic device 510. The link "ladder game" 610 may be displayed on the first electronic device 510. In response to a selection from the user of the first electronic device 510 on the link "ladder game" 610, the ladder game application may be executed on the first electronic device 510. Each of the first electronic device 510 and the second electronic device 520 may be connected to the server 150 under control of the ladder game application. The participants A and B, that is, the user of the first electronic device 510 and the user of the second electronic device 520 may play the ladder game together based on information about the participants included in the hidden attribute information 540.

Also, according to an example embodiment, a ladder game multi-play service may be provided through a separate game server that provides a ladder game. To this end, the first electronic device 510 and the second electronic device 520 may provide information about the participants included in the hidden attribute information 540 to a game server and the game server may provide a service for the participants A and B.

Also, the hidden attribute information 540 may further include information about "host". A role of the "host" may differ for the respective contents. In the content "ladder game," the host may serve to generate an additional line to a ladder including a desired (or, alternatively, predetermined) number of lines. In the examples of FIGS. 5 and 6, the service may be provided such that the user of the first electronic device 510 corresponding to the host may additionally generate lines of the ladder.

Although an example of playing content between two users is described as an example with reference to FIGS. 5 and 6, it is only an example. If three or more users participate into a communication session, the content may be played among the three or more users. For example, the hidden attribute information added message 550 may be transferred to all of the users that participate into the communication session, and the users may selectively access the provided content based on the hidden attribute information added message 550. Here, the content may be provided to all of the connected users, such as a ladder game, and may be individually provided to each user, depending on a characteristic of the content.

Figure 7:
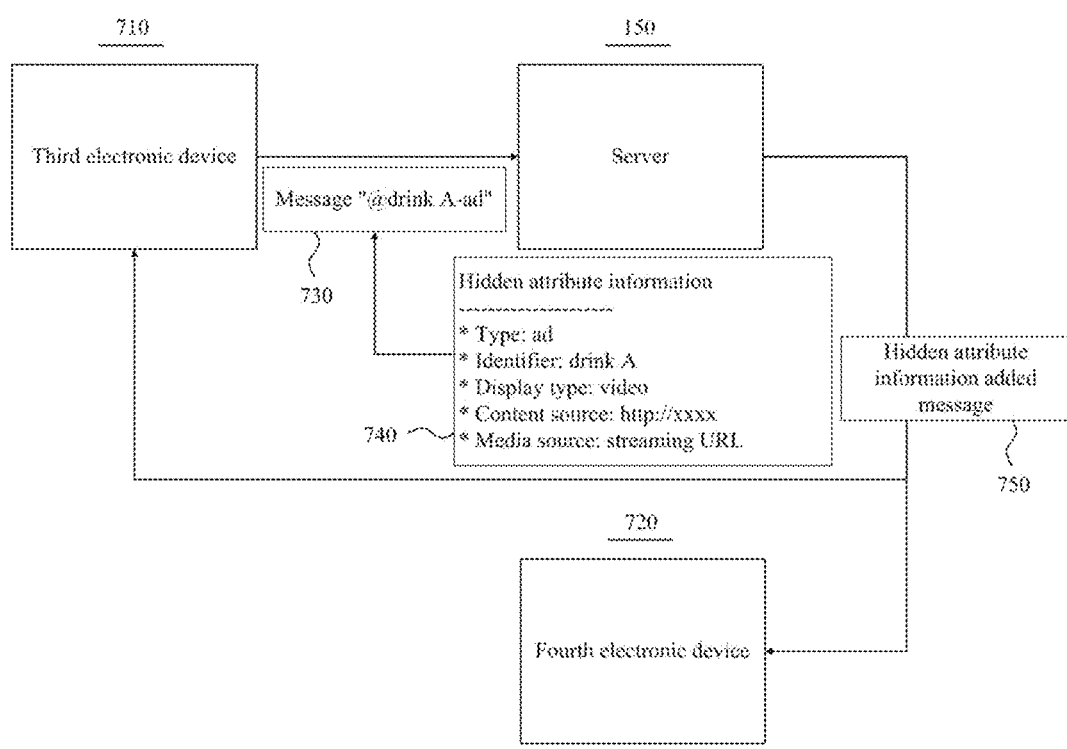
FIGS. 7 and 8 illustrate examples of a process of playing content individually provided to each user according to at least one example embodiment.
Figure 8:
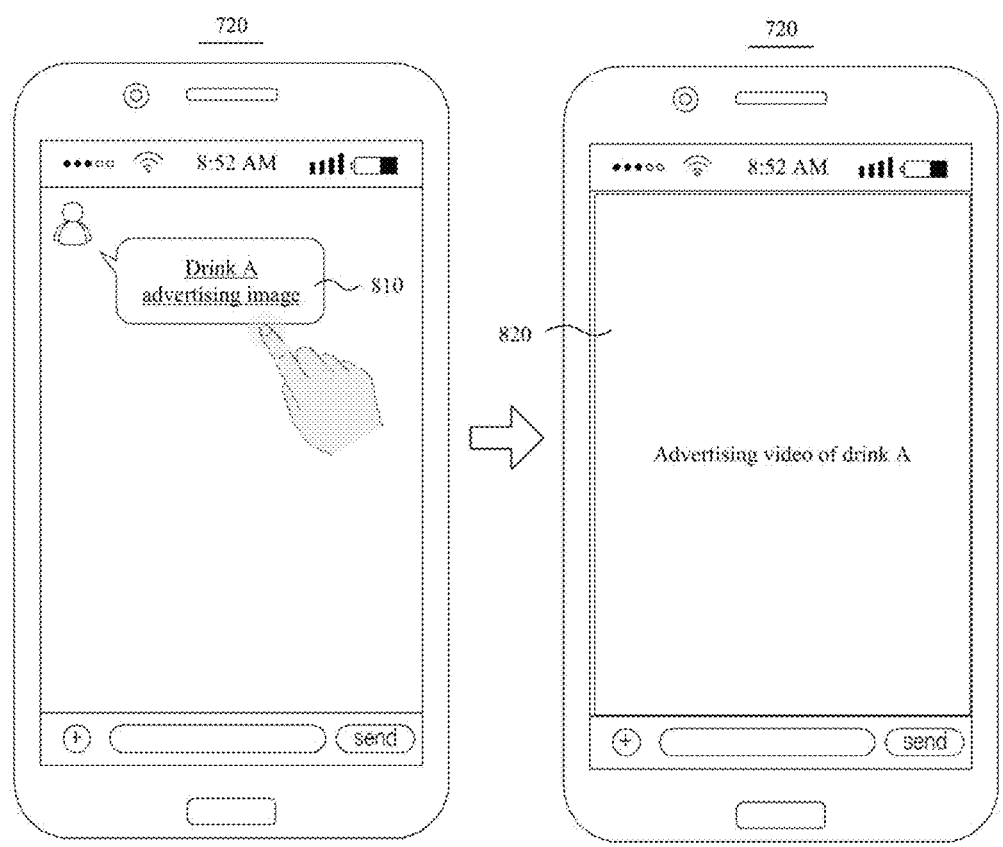

FIGS. 7 and 8 illustrate examples of a process of playing content individually provided to each user according to at least one example embodiment.

FIG. 7 illustrates an example in which a third electronic device 710 transmits a message "@drink A-ad" 730 to the server 150 in a communication session connected with the third electronic device 710 and a fourth electronic device 720. In this example, the server 150 may verify a preset (or, alternatively, desired) character "@" in the message "@drink A-ad" 730, may extract a keyword "drink A-ad", and may determine or generate hidden attribute information 740 of content corresponding to the keyword "drink A-ad". Also, the server 150 may add the determined or generated hidden attribute information 740 to the message "@drink A-ad" 730 and may generate a hidden attribute information added message 750. The server 150 may transmit the generated hidden attribute information added message 750 to the third electronic device 710 and the fourth electronic device 720 connected to the communication session.

FIG. 8 illustrates an example of displaying a link "drink A advertising image" 810 on a chat window screen of the fourth electronic device 720, and illustrates an example of playing an "advertising video of drink A" 820 through a separate application, for example, a video play application in response to a user selection on the link "drink A advertising image" 810. The video may be provided to each of the users that select the link "drink A advertising image" 810.

In the hidden attribute information 740 of FIG. 7, "type" may indicate that a type of content is an advertisement and "identifier" may indicate that an identifier of the content. A display type may include at least one of various play types, such as a URL, an image, a text, a video, an audio, and the like, as a type of content to be played. In the hidden attribute information 740, a play type of content is a video. For example, referring to FIG. 8, the "advertising video of drink A" 820 may be provided through the fourth electronic device 720 based on the hidden attribute information 740 indicating that the content is an advertisement of a video type. The fourth electronic device 720 may access the content through a content source and may be provided with the content through a selected application based on a media source using a streamlining method.

Figure 9:
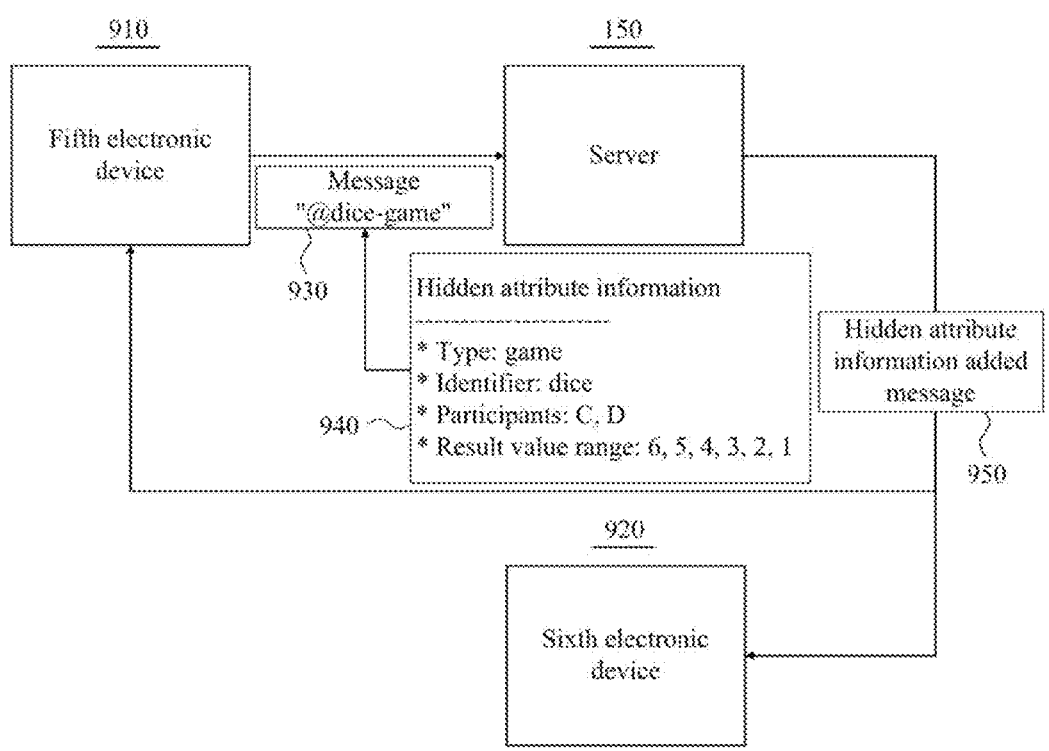
FIGS. 9 and 10 illustrate examples of a process of providing content using hidden attribute information according to at least one example embodiment.
Figure 10:
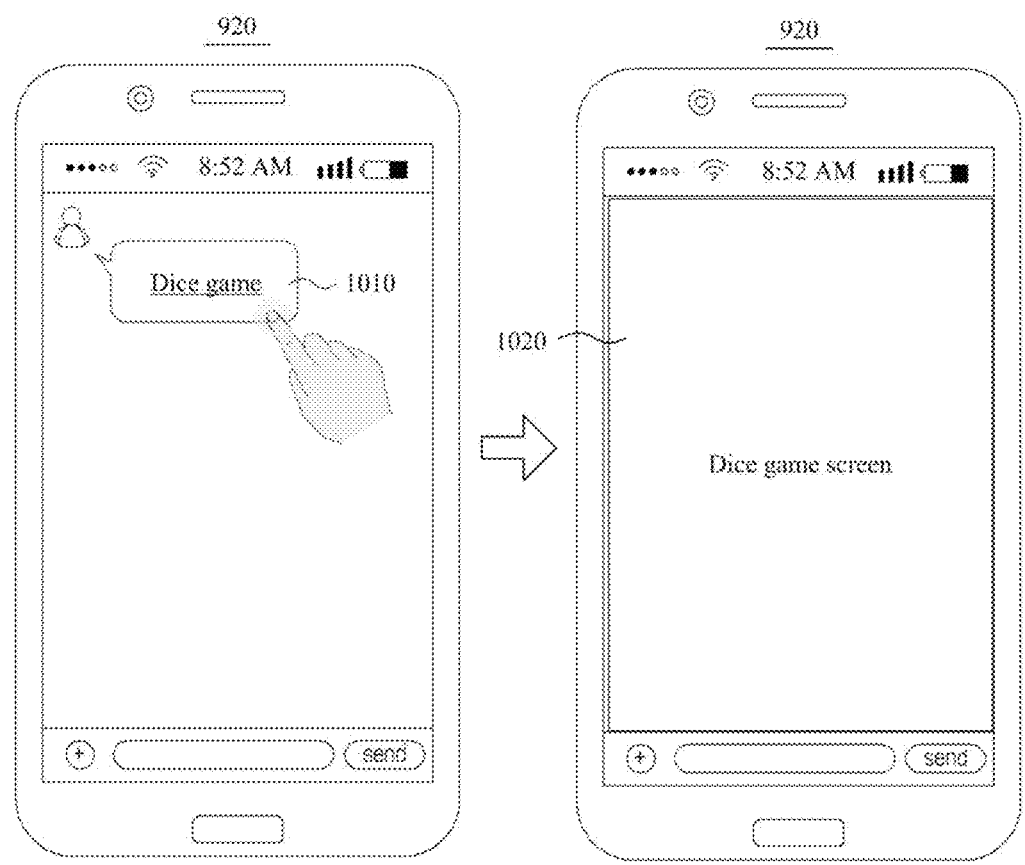

FIGS. 9 and 10 illustrate examples of a process of providing content using hidden attribute information according to at least one example embodiment.

FIG. 9 illustrates an example of transmitting a message "@dice-game" 930 from a fifth electronic device 910 to the server 150 in a communication session connected with the fifth electronic device 910 and a sixth electronic device 920.

Here, the server 150 may verify a preset (or, alternatively, desired) character "@" from the message "@dice-game" 930, may extract a keyword "dice-game", and may determine or generate hidden attribute information 940 of content corresponding to the keyword "dice-game". Also, the server 150 may add the determined or generated hidden attribute information 940 to the message "@dice-game" 930 and may generate a hidden attribute information added message 950. The server 150 may transmit the generated hidden attribute information added message 950 to the fifth electronic device 910 and the sixth electronic device 920 connected to the communication session.

FIG. 10 illustrates an example of displaying a link "dice game" 1010 on a chat window screen of the sixth electronic device 920, and also illustrates an example of playing a "dice game screen" 1020 through a separate application, for example, a dice game application in response to a user selection on the link "dice game" 1010. According to at least some example embodiments, the sixth electronic device 920 may provide the link 1010 in response to the hidden attribute information 940 included in the hidden attribute information added message 950. For example, receipt of the hidden attribute information 940 at the sixth electronic device 920 may cause the sixth electronic device 920 to provide the link 1010 in the manner shown in FIG. 10. Further, in the hidden attribute information 940 of FIG. 9, a result value range may indicate the range of a content play result, for example, a result of rolling a dice, and thus, can be selectively used if necessary. For example, if the result value range includes "6, 5, 4, 3, 2, 1" (or "100, 90, 80, 70, 60, 50"), a value of rolling a dice may be indicated as one of "6, 5, 4, 3, 2, 1" (or "100, 90, 80, 70, 60, 50").

As described above, a link for playing content may be generated using a URL of the content. For example, the link "dice game" 1010 may be generated based on a URL of a dice game provided in a form of a flash game on a web or a URL for executing an application for the dice game. A page or application for the dice game may be connected in advance to the server 150. The dice game may be provided to a user through the web or the application in response to a selection on the link. Here, the page or the application connected to the server 150 may execute the dice game based on hidden attribute information. If the content is an advertising video, a link for playing the content may include a function for connecting to a URL of a video file. In this case, in response to a user click on the link, the user may connect to the corresponding URL and at the same time, a media player may be executed at an electronic device of the user.

As described above, hidden attribute information may include at least one of a type and an identifier of content. Here, if an electronic device, for example, the second electronic device of FIGS. 3 and 4, receives a message that includes the hidden attribute information from the server 150, the electronic device may play content corresponding to a type or an identifier of content based on the hidden attribute information. For example, if the content is stored in the second electronic device, the second electronic device may immediately search for and play content corresponding to a type or an identifier.

Also, the hidden attribute information may further include at least one of source information about the content and source information about a medium that provides the content. In this example, the second electronic device may play the content based on the at least one source information. For example, the second electronic device may connect to the content over a network based on source information about the content. The second electronic device may download and play the connected content, and may also be provided with the content using a streaming method through a specific medium.

Also, the hidden attribute information may further include a display type of the content. Here, the display type may include at least one of a URL, an image, a video, and an audio. In this case, the second electronic device may play the content based on the display type. For example, an advertisement in an image type and an advertisement in a video type may be present with respect to the same product. In this example, if hidden attribute information of a message received at the second electronic device includes a video type as a display type, the second electronic device may receive and play an advertisement of the video type.

Also, the hidden attribute information may include information about participants to participate into the content. Here, the participants may include at least a portion of participants of the communication session. As described above with reference to the example embodiments of FIGS. 3 and 4, the server 150 may provide a service such that the participants included in the hidden attribute information may play the content together. Also, as described above, a separate server associated with the content may provide a service such that the participants may play the content together.

Also, the hidden attribute information may include information about a host (e.g., information identifying a host). The host may be a participant and an electronic device (or, alternatively, a user of an electronic device) that is designated as having the right to control progress of the content among the participants. For example, the host may have a right to change game settings and the like, or may have a right to set a game start condition and the like. For example, the server 150 or a separate server associated with the content may proceed with the service in response to a progress instruction received from an electronic device of the host.

Also, the hidden attribute information may further include information about the range of a result value derivable based on play of the content. In this case, the second electronic device may play the content based on the range of the result value.

Also, the hidden attribute information may further include information about an application in which the content is to be played. In this case, the second electronic device may execute the application and may play the content through the executed application.

In addition, the hidden attribute information may include information required to provide each of various contents in a message in order to provide various contents. For example, to provide content associated with a map, the hidden attribute information may further include information about specific coordinates, for example, a location of an electronic device having transmitted a message or a location of an electronic device having received the message.

Example embodiments of displaying a link for playing content in response to a message in a communication session and playing the content through an application executed through the link are described with reference to FIGS. 5 through 10. However, some contents may be played at a chat room provided through a communication session instead of using a separate link or application. For example, image-type content may be immediately displayed at a chatroom. That is, content may be played based on hidden attribute information added to a message in the communication session.

Figure 11:
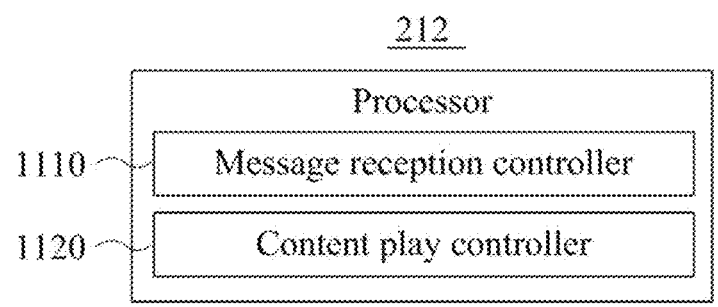
FIG. 11 is a block diagram illustrating an example of a processor of an electronic device according to at least one example embodiment.
Figure 12:
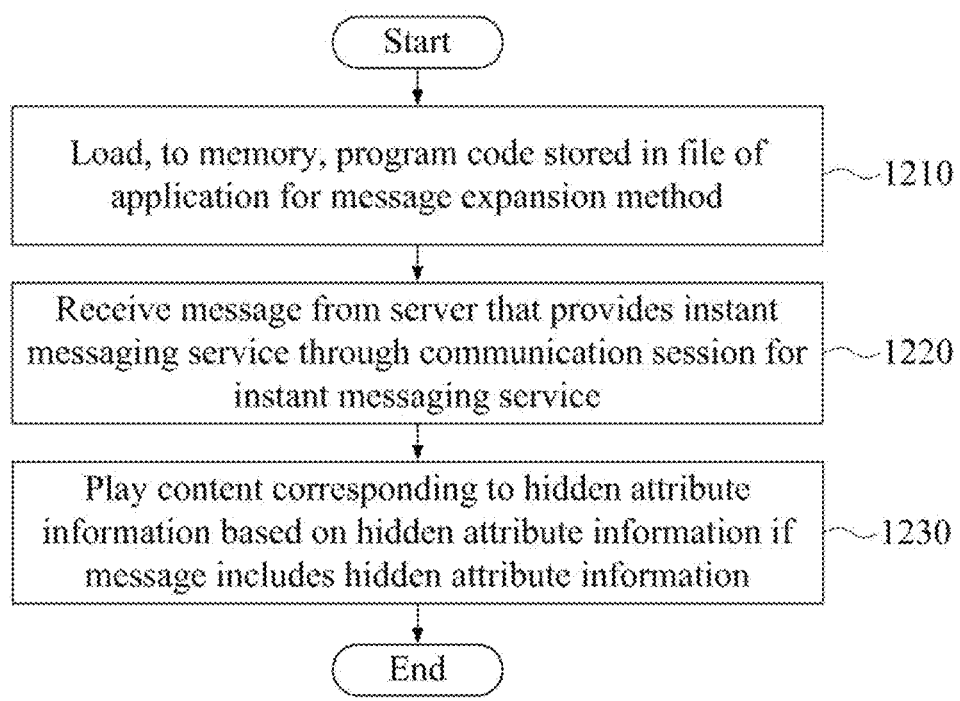
FIG. 12 is a flowchart illustrating an example of a message expansion method performed at an electronic device according to at least one example embodiment.

FIG. 11 is a block diagram illustrating an example of a processor includable in an electronic device according to at least one example embodiment, and FIG. 12 is a flowchart illustrating an example of a message expansion method performed at an electronic device according to at least one example embodiment.

Referring to FIG. 11, the processor 212 of the electronic device 110 may include a message reception controller 1110 and a content play controller 1120. The processor 212 and the constituent elements of the processor 212 may control the electronic device 110 to perform operations 1210 through 1230 included in the message expansion method of FIG. 12. Here, the processor 212 and the constituent elements of the processor 212 may be configured to execute at least one program code, for example, computer-readable instructions, and a code of an OS included in the memory 211. For example, according to at least one example embodiment, operations described herein as being performed by any or all of the message reception controller 1110 and a content play controller 1120 may be performed by a processor (e.g., the processor 212) executing program code that includes instructions corresponding to the operations. The instructions may be stored, for example, in a memory of the electronic device 110.

In operation 1210, the processor 212 may load, to the memory 211, a program code stored in a file of an application for the message expansion method. For example, a program file of the application may be provided from a file distribution server over the network 170, and may be used to install the application on the electronic device 110. In response to executing the application installed on the electronic device 110, the processor 212 may be loaded to the memory 211.

Here, each of the processor 212, and the message reception controller 1110 and the content play controller 1120 included in the processor 212 may perform operations 1220 and 1230 by executing a portion corresponding to the program code loaded to the memory 211. Here, the processor 212 and the constituent elements of the processor 212 may control the electronic device 110 to perform the message expansion method. For example, the processor 212 may control the communication module 213 included in the electronic device 110 such that the electronic device 110 may communicate with the server 150 or other electronic devices. As another example, when loading the program code to the memory 211, the processor 212 may control the electronic device 110 to store the program code to the memory 211.

In operation 1220, the message reception controller 1110 may receive a message from the server 150 that provides an instant messaging service through a communication session for the instant messaging service. An example of transmitting and receiving a message through the instant messaging service is described above.

In operation 1230, if the message includes hidden attribute information, the content play controller 1120 may play content corresponding to the hidden attribute information based on the hidden attribute information. As described above, the server 150 may receive the message from another electronic device, for example, the electronic device 120, through the communication session, may determine hidden attribute information for playing content corresponding to a keyword further included in the message, if a preset (or, desired) character is included in the message, may add the hidden attribute information to the message, and may transmit, to the electronic device 110, the message to which hidden attribute information is added.

Example embodiments of hidden attribute information, a message that includes the hidden attribute information, and an electronic device of playing content based on the message that includes the hidden attribute information are described with reference to FIGS. 3 and 4 and a repeated description is omitted.

According to an example embodiment, hidden attribute information may further include a game progress result. The hidden attribute information may further include information about a play result of content. In this case, the second electronic device according to example embodiments of FIGS. 3 and 4 may control play of the content so that a preset (or, alternatively, predetermined) play result may be derived based on information about the play result. For example, in the case of a ladder game, the server 150 may add, to a message, hidden attribute information that includes a result of the ladder game, and may transmit the message to electronic devices of participants. A progress process and a progress result of the ladder game may be displayed on the electronic devices of the participants.

Figure 13:
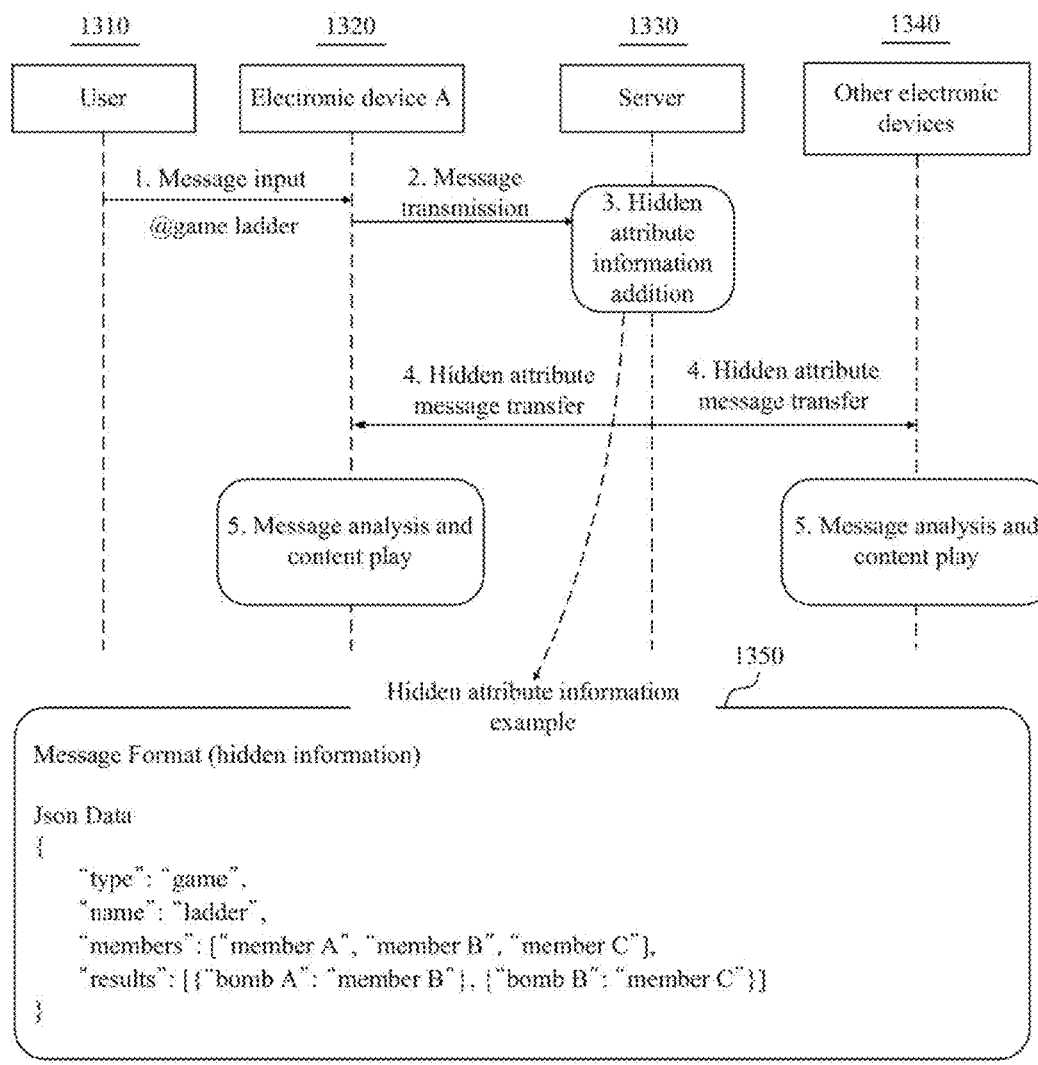
FIG. 13 illustrates an example of using hidden attribute information including a game progress result according to at least one example embodiment.

FIG. 13 illustrates an example of using hidden attribute information including a game progress result according to at least one example embodiment. FIG. 13 illustrates a user 1310, an electronic device A 1320, a server 1330, and other electronic devices 1340, and illustrates an example in which the electronic device A 1320 and the other electronic devices 1340 are connected to a single communication session, for example, a single chatroom.

1. In a message input process, the user 1310 inputs a message through the electronic device A 1320. For example, the electronic device A 1320 may connect to a chatroom and provide a message input interface to the user 1310 under control of a message application. Here, the user 1310 may input the message, for example, @ game ladder, using the provided message input interface.

2. In a message transmission process, the electronic device A 1320 transmits the input message to the server 1330. For example, data including a text "@ game ladder" input from the user 1310 may be transmitted to the server 1330 over a network.

3. In a hidden attribute information adding process, the server 1330 adds hidden attribute information to the received message. For example, the server 1330 may recognize a preset (or, alternatively, desired) character "@" in the text "@ game ladder" included in the received message, may recognize "game ladder" as a keyword, may determine hidden attribute information for playing content corresponding to the recognized keyword, and may add the determined hidden attribute information to the message.

4. A hidden attribute message transfer process shows an example in which the server 1330 transfers the message to which hidden attribute information is added to target electronic devices, for example, the electronic device A 1320 and the other electronic devices 1340. For example, a target of the message may be members A, B, and C shown in a hidden attribute information example 1350.

Referring to the hidden attribute information example 1350, the hidden attribute information indicates that a type of content is a game and a name of the content is a ladder game. Also, the hidden attribute information indicates that a game proceeds with respect to the members A, B, and C. The hidden attribute information indicates that a bomb A is allocated to the member B and a bomb B is allocated to the member C as results of the ladder game.

5. In a message analyzing and content play process, electronic devices that receive the message may analyze the received message and may play the content based on the hidden attribute information. For example, the message analysis may be performed under control of the message application in response to a request from the electronic device A 1320 to a messenger application installed on the electronic device 1320 for the message analysis. The messenger application may proceed with the ladder game based on the hidden attribute information of the analyzed message. That is, each of the electronic devices that receive the message may proceed with the ladder game and may play a process of displaying game results included in the hidden attribute information.

Also, a keyword included in an initial message may be expanded to further include additional information in addition to a type of content and an identifier of the content. For example, the keyword may further include information used for designating a target, for example, the aforementioned member, to participate into the content, information, for example, the number of bombs, about play results of the content, etc., as additional information. In this case, the hidden attribute information may be determined by further using additional information.

According to example embodiments, in response to a preset (or, alternatively, desired) character and keyword input from a user, details associated with the keyword may be recommended to the user. For example, a keyword included in a message may include an initial keyword and an additional keyword. In this case, in response to the character and the initial keyword input from the user of the first electronic device according to the example embodiments of FIGS. 3 and 4, the first electronic device may provide an additional information list corresponding to the initial keyword to the user of the first electronic device. Here, the first electronic device may add, to the keyword, an additional keyword corresponding to additional information selected by the user from the additional information list.

For example, in response to a text "@ game" input from the user to the electronic device, for example, the first electronic device, the electronic device may provide a game list to the user under control of a messenger application. In response to a user selection on a ladder game from the game list, the message may automatically further include identifier information about the selected game, for example, "@ game ladder", and may be transmitted to the server 150. That is, a help function for completing a keyword sentence through the messenger application may be provided to the user.

Figure 14:
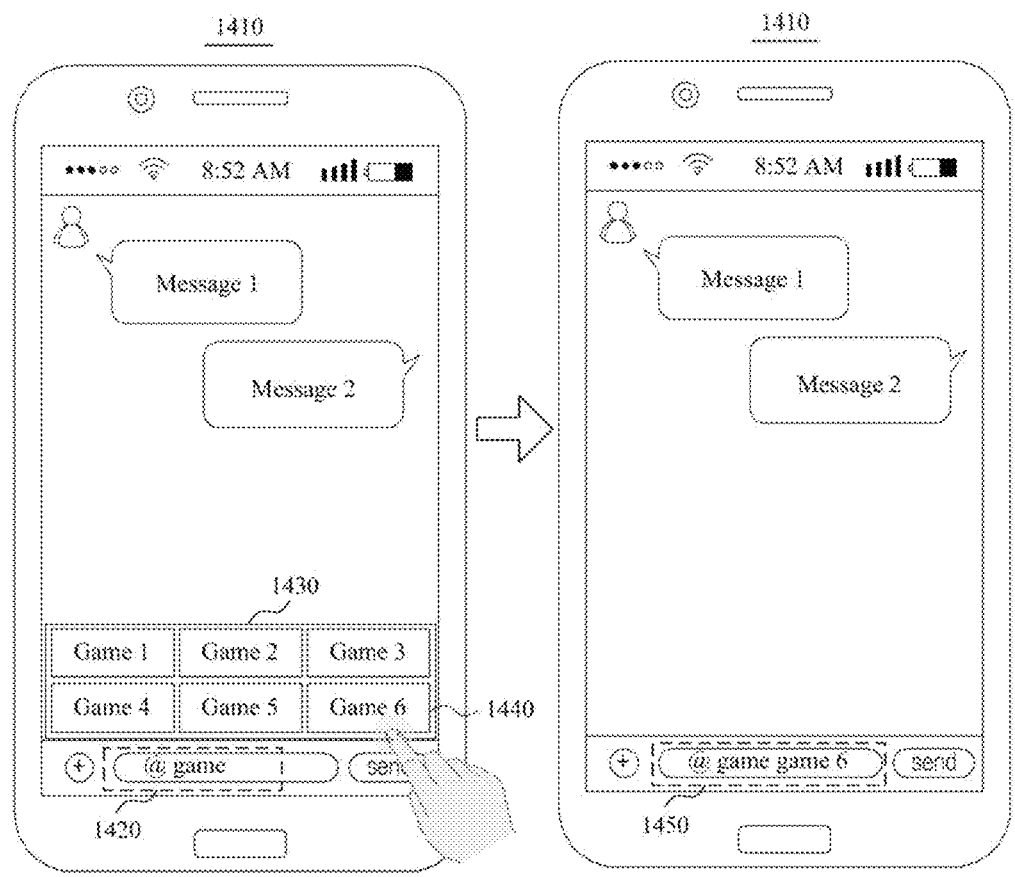
FIG. 14 illustrates an example of a function for recommending an additional keyword according to at least one example embodiment.

FIG. 14 illustrates an example of a function for recommending an additional keyword according to at least one example embodiment. FIG. 14 illustrates examples of a screen of an electronic device 1410. Referring to FIG. 14, a first box 1420 indicated with dotted lines shows an example in which a user inputs a text "@ game". Here, the electronic device 1410 may display a game list 1430 on a screen as details associated with the input text "@ game" under control of a messenger application installed on the electronic device 1410, and may provide the game list 1430 to the user. When it is assumed that the user selects a game 6 1440 on the game list 1430, the screen of the electronic device 1410 may be changed from one show on the left to one shown on the right. On the screen of the electronic device 1410 shown on the right, a second box 1450 indicated with dotted boxes shows an example in which the text is automatically changed from "C@ game" to "@ game game 6" in response to a user selection on the game 6 1440.

In response to a user selection on advertising content such as "@ ad", an advertisement list may be provided to the user to select a type of advertisement or a specific advertisement.

Also, a help function for inputting additional information may be provided. For example, once the user selects the game 6 1440, an interface for helping an input of additional information, which may be input as a keyword in association with the game 6 1440, may be provided to the user. In detail, if the game 6 1440 is a dice game, the electronic device 1410 may provide the user with a user interface for setting a game target. Descriptions set by the user through the provided user interface may be included in the message as the keyword and may be transmitted to the server.

Also, a function for additionally displaying a help or a guide for each game of the game list may be further provided.

According to at least some example embodiments, since a message to which hidden attribute information is added is transferred to a reception side in response to a keyword of a message transmitted through an instant messaging service, the reception side may play a variety of contents in various manners based on the hidden attribute information.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

Instructions for implementing at least some example embodiments may be recorded in non-transitory computer-readable media. These instructions may be, for example, program instructions to implement various operations embodied by a computer. The media may also include, alone or in combination with the program instructions, data files, data structures, and the like. According to at least some example embodiments, the media and program instructions may be those specially designed and constructed for the purpose of implementing at least some example embodiments. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as that produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications as would be obvious to one skilled in the art are intended to be included within the scope of the disclosure.

What is claimed is:

1. A system comprising:
a memory configured to store computer-readable instructions; and
one or more processors configured to execute the computer-readable instructions such that the one or more processors are configured to,
receive a message from a first electronic device connected to a communication session for an instant messaging service,
determine hidden attribute information for playing content corresponding to a keyword using the keyword further included in the message, if the message includes a desired character,
add the determined hidden attribute information to the message, and
transmit the message to which the hidden attribute information is added, to a second electronic device connected to the communication session through the communication session.

2. The system of claim 1, wherein the one or more processors are configured to execute the computer-readable instructions such that the one or more processors are configured to,
store and manage information about a plurality of contents preset corresponding to a plurality of keywords, respectively, in association with the plurality of keywords, and
generate hidden attribute information about the content corresponding to the keyword further included in the message among the plurality of contents.

3. The system of claim 1, wherein the one or more processors are configured to execute the computer-readable instructions such that the determining of the hidden attribute information includes generating the hidden attribute information to include at least one of a type and an identifier of the content, such that the hidden attribute information is information that causes the second electronic device to play content corresponding to the type or the identifier.

4. The system of claim 3, wherein the one or more processors are configured to execute the computer-readable instructions such that the determining of the hidden attribute information further includes generating the hidden attribute information to include information about a play result of the content, such that the hidden attribute information is information that causes the second electronic device to control play of the content to derive the play result based on information about the play result.

5. The system of claim 3, wherein the one or more processors are configured to execute the computer-readable instructions such that the determining of the hidden attribute information includes generating the hidden attribute information to include at least one of source information about the content and source information of a medium that provides the content, such that the hidden attribute information is information that causes the second electronic device to play the content based on the at least one source information.

6. The system of claim 3, wherein the one or more processors are configured to execute the computer-readable instructions such that the determining of the hidden attribute information further includes generating the hidden attribute information to include a display type of the content, such that the hidden attribute information is information that causes the second electronic device to play the content based on the display type,
the display type including at least one of a uniform resource locator (URL), an image, a video, and an audio.

7. The system of claim 3 wherein,
the hidden attribute information further includes information identifying participants,
the identified participants include at least a portion of participants of the communication session, and
the one or more processors are configured to execute the computer-readable instructions such that the one or more processors are configured to provide a service that allows the identified participants to play the content together.

8. The system of claim 7, wherein the hidden attribute information further includes information identifying a host, and
the one or more processors are configured to execute the computer-readable instructions such that the one or more processors are configured to proceed with the service in response to a progress instruction received from an electronic device of the host.

9. The system of claim 3, wherein the one or more processors are configured to execute the computer-readable instructions such that the determining of the hidden attribute information further includes generating the hidden attribute information to include information about a range of a derivable result value based on play of the content, such that the hidden attribute information is information that causes the second electronic device to play the content based on a range of the result value.

10. The system of claim 3, wherein the one or more processors are configured to execute the computer-readable instructions such that the determining of the hidden attribute information further includes generating the hidden attribute information to include information about an application in which the content is to be played, such that the hidden attribute information is information that causes the second electronic device to execute the application and play the content through the executed application.

11. The system of claim 1, wherein the one or more processors are configured to execute the computer-readable instructions such that the determining of the hidden attribute information further includes generating the hidden attribute information to include information that causes the second electronic device to, display a link for playing the content in response to the message in the communication session,
execute an application for playing the content corresponding to the hidden attribute information included in the message through the link, and
play the content through the application.

12. The system of claim 1, wherein the one or more processors are configured to execute the computer-readable instructions such that the determining of the hidden attribute information further includes generating the hidden attribute information to include information that causes the second electronic device to play the content based on the hidden attribute information added to the message in the communication session.

13. The system of claim 1, further comprising:
the first electronic device,
the keyword including an initial keyword and an additional keyword,
the first electronic device including,
  a memory configured to store computer-readable instructions, and
  one or more processors configured to execute the computer-readable instructions such that the one or more processors of the first electronic device are configured to,
    in response to the desired character and the initial keyword input from a user of the first electronic device,
  provide an additional information list corresponding to the initial keyword to the user of the first electronic device and add an additional keyword corresponding to additional information selected by the user of the first electronic device from the additional information list to the keyword.

14. A method of expanding a message, the method comprising:
receiving a message from a first electronic device connected to a communication session for an instant messaging service, the message including a keyword;
determining hidden attribute information for playing content corresponding to the keyword, if the message includes a desired character;
adding the determined hidden attribute information to the message; and
transmitting the message to which the hidden attribute information is added, to a second electronic device connected to the communication session through the communication session.

15. The method of claim 14, further comprising:
storing and managing information identifying a correspondence between a contents from among a plurality of contents and keywords from among a plurality of keywords, respectively,
wherein the determining includes generating hidden attribute information with respect to content, among the plurality of contents, that corresponds to the keyword included in the message.

16. A method of expanding a message, the method comprising:
receiving a message at a first electronic device connected to a communication session for an instant messaging service, the message being received from a server that provides the instant messaging service through the communication session; and
playing content at the first electronic device if the message includes the hidden attribute information, the content corresponding to hidden attribute information,
wherein the server,
  receives the message from a second electronic device through the communication session,
  determines the hidden attribute information for playing content corresponding to a keyword further included in the message if the message includes a desired character,
  adds the hidden attribute information to the message, and
  transmits, to the first electronic device, the message to which the hidden attribute information is added.

17. The method of claim 16, wherein the playing of the content includes playing content corresponding to a type or an identifier of the content included in the hidden attribute information.

18. The method of claim 17 wherein,
the hidden attribute information includes at least one of source information about the content and source information of a medium that provides the content, and
the playing of the content includes playing the content based on the at least one source information.

19. The method of claim 17 wherein,
the hidden attribute information further includes a display type of the content,
the display type includes at least one of a uniform resource locator (URL), an image, a video, and an audio, and
the playing of the content includes playing the content based on the display type.

20. The method of claim 17 wherein,
the hidden attribute information further includes information identifying participants,
the identified participants include at least a portion of participants of the communication session, and
the playing of the content includes receiving a service that allows the identified participants to play the content together.

21. The method of claim 20 wherein,
the hidden attribute information further includes information about a host, and
the received service proceeds in response to a progress instruction transmitted from an electronic device of the host to the server.

22. The method of claim 17 wherein,
the hidden attribute information further includes information about a range of a derivable result value based on play of the content, and
the playing of the content includes playing the content based on a range of the result value.

23. The method of claim 17 wherein,
the hidden attribute information further includes information about an application in which the content is to be played, and
the playing of the content includes executing the application and playing the content through the executed application.

24. The method of claim 16, wherein the playing of the content includes,
displaying a link for playing the content in response to the message in the communication session,
executing an application for playing the content corresponding to the hidden attribute information included in the message in response to a selection on the link, and
playing the content through the application.

25. The method of claim 16, wherein the playing of the content includes playing the content based on the hidden attribute information added to the message in the communication session.

* * * * *